United States Patent
Yagi et al.

[11] Patent Number: 6,030,468
[45] Date of Patent: *Feb. 29, 2000

[54] COLD ACCUMULATOR

[75] Inventors: Wataru Yagi, Nagoya; Masuo Yamada, Kariya; Tetsuya Goto, Nagoya; Yoshiki Hoshino, Niwa-gun; Uichiro Mizutani, Nagoya, all of Japan

[73] Assignee: Aisin Seiki Kabushiki Kaisha, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/909,159

[22] Filed: Aug. 11, 1997

Related U.S. Application Data

[63] Continuation of application No. 08/429,839, Apr. 27, 1995, abandoned.

[30] Foreign Application Priority Data

Apr. 27, 1994 [JP] Japan .................................. 6-090161

[51] Int. Cl.[7] .................................. F25B 9/00; H01F 1/04
[52] U.S. Cl. .................................. 148/301; 420/416; 62/6
[58] Field of Search .......................... 148/301; 420/416; 62/3.1, 4, 6, 51.1

[56] References Cited

U.S. PATENT DOCUMENTS

| | | | |
|---|---|---|---|
| 4,082,138 | 4/1978 | Mie dema et al. | 62/6 |
| 5,186,765 | 2/1993 | Arai et al. | 148/301 |
| 5,207,981 | 5/1993 | Hanaue et al. | 420/416 |
| 5,269,854 | 12/1993 | Takahashi et al. | 148/301 |

FOREIGN PATENT DOCUMENTS

| | | |
|---|---|---|
| 0 327 293 B1 | 8/1989 | European Pat. Off. . |
| 1-310269 | 12/1989 | Japan . |
| 4-242901 | 8/1992 | Japan . |
| 63-179052 | 9/1993 | Japan . |

*Primary Examiner*—Sikyin Ip
*Attorney, Agent, or Firm*—Burns, Doane, Swecker & Mathis, LLP

[57] ABSTRACT

A cold accumulator filled with a cold accumulating material including 20 to 95 at % of at least one element selected from the group consisting of cerium (Ce), neodymium (Nd), praseodymium (Pr), magnetic body dysprosium (Dy), holmium (Ho), erbium (Er) and thulium (Tm), and 5 to 80 at % of an additive containing at least silver (Ag), thereby improving the specific heat at 10 to 30 K. The cold accumulating material can increase the efficiency of heat accumulating at 10 to 30 K, and the cold accumulator can be applied to refrigerators which generate refrigeration at cold low temperatures of 10 to 30 K.

13 Claims, 4 Drawing Sheets

COLD ACCUMULATOR

This application is a continuation of application Ser. No. 08/429,839, filed Apr. 27, 1995 now abandoned.

FIELD OF THE INVENTION

The present invention relates to a cold accumulator and more particularly to cold accumulating material having a large specific heat at low temperature which is useful for all kinds of refrigerators.

BACKGROUND OF THE INVENTION

A refrigerator which uses any kind of cold accumulator such as a Stirling type, a GM type (Gifford-MacMahon type), or a pulse tube type needs a cold accumulator filled up with cold accumulating material in order to increase the refrigerant efficiency of refrigeration. These cold accumulators take heat from a compressed operating gas which flows in one direction, accumulate the heat, and transfer the accumulated heat to an expanded operating gas which flows in another direction.

Conventionally, an alloy of copper or lead, etc., is mainly used for a cold accumulating material filled up in the cold accumulator. However, since the specific heat of copper or lead is due only to lattice vibration, the specific heat is large at temperatures above 40 K but extremely small at low temperatures below 20 K.

As a result of this, when a cold accumulator filled up with such cold accumulating material is used in a refrigerator (more particularly multiple type refrigerator), the cold accumulator cannot fully absorb the heat from the compressed operating gas, and also cannot fully transfer the heat to the expanded operating gas. A result of this is that the cold accumulator filled up with the cold accumulating material cannot reach extremely low temperatures.

Cold accumulators proposed to solve the problem described above are disclosed in Japanese Laid-Open Patent Application No. 1(1989)-310269, European Patent No. 327293 B1 and U.S. Pat. No. 5,186,765, the disclosures of which relating to use of cold accumulating material in low-temperature refrigeration equipment are hereby incorporated by reference. As the typical example, the cold accumulator is filled up with cold accumulating material of a magnetic body made from $Er_3Ni$. The specific heat of $Er_3Ni$ is due to lattice vibration and spin vibration. This specific heat is larger than the cold accumulator material made of copper or lead at extremely low temperatures below 20 K (more particularly under 10 K), so that these cold accumulators can improve the efficiency of accumulating heat.

However, the cold accumulator material made of $Er_3Ni$ has a magnetic critical point (a phase transition between magnetic states) at about 8 K. Therefore, while the specific heat is large at temperatures under 10 K, it is small in the temperature range 10 to 30 K. As a result of this, though the efficiency of accumulating heat is large at temperatures under 10 K, it is not enough in the temperature range 10 to 30 K. Accordingly, cold accumulator material made of $Er_3Ni$ is less efficient for refrigerators which generate refrigeration in the temperature range 10 to 30 K.

SUMMARY OF THE INVENTION

Accordingly, it is an object of the invention to provide a cold accumulator having cold accumulating material which can improve the efficiency of the accumulating heat in the temperature range 10 to 30 K.

The invention provides a cold accumulator filled with a cold accumulating material comprising 20 to 95 atomic ("at") % of at least one rare earth element preferably selected from the group consisting of cerium (Ce), neodymium (Nd), praseodymium (Pr), magnetic body dysprosium (Dy), holmium (Ho), erbium (Er), and thulium (Tm), and 5 to 80 at % of at least one additive containing silver (Ag).

The additive may also contain one or more additive elements selected from the group consisting of boron (B), aluminum (Al), indium (In), silicon (Si), germanium (Ge), gallium (Ga), tin (Sn), gold (Au), magnesium (Mg), zinc (Zn), palladium (Pd), platinum (Pt), rhenium (Re), cesium (Cs), iridium (Ir), iron (Fe), manganese (Mn), chromium (Cr), cadmium (Cd), mercury (Hg), osmium (Os), phosphorus (P), lanthanum (La) and yttrium (Y). The total of the additive elements may be present in an amount of 5 at % or less.

DETAILED DESCRIPTION OF PREFERRED EMBODIMENTS OF THE INVENTION

Figure 5:
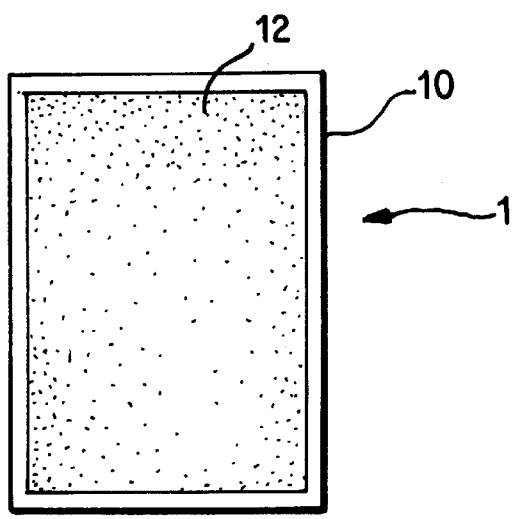
FIG. 5 is a cross-sectional view of a cold accumulator containing cold accumulating material according to the invention.

As shown in FIG. 5, cold accumulator 1 includes a casing 10 for housing therein cold accumulating material 12 in accordance with the present invention. The cold accumulator can be used in various types of refrigerators such as those mentioned above. For instance, in one type of refrigerator, a refrigerant gas is compressed and then passed in one direction through the cold accumulating material, the gas is expanded and then passed in an opposite direction back through the cold accumulating material.

Figure 1:
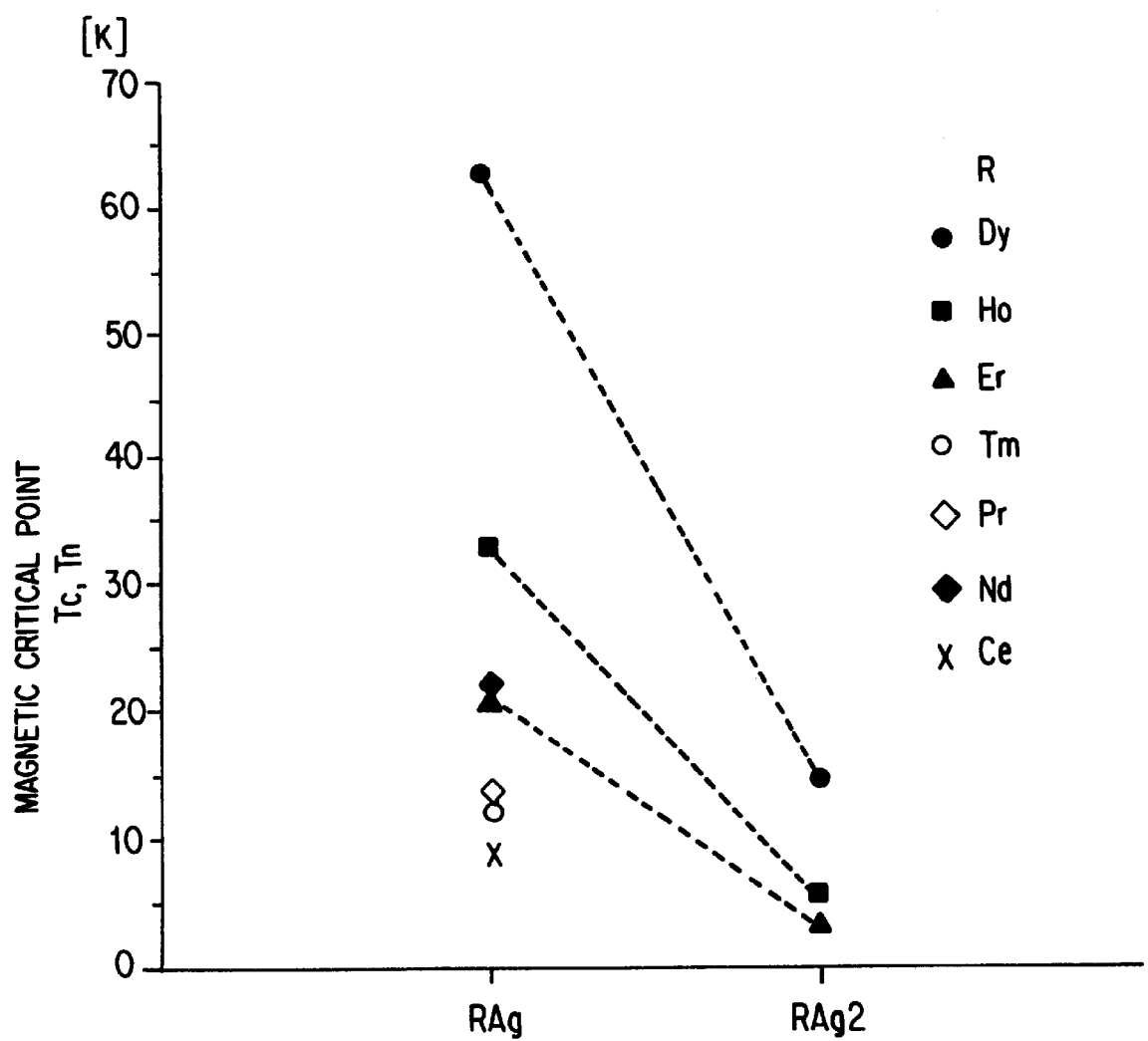
FIG. 1 is a graph of characteristics of the magnetic critical point (magnetic transformation point) of cold accumulating materials according to the invention.

FIG. 1 shows characteristics of cold accumulating material according to the invention wherein the material includes one or more rare earth elements (R) selected from the group consisting of cerium (Ce), neodymium (Nd), praseodymium (Pr), magnetic body dysprosium (Dy), holmium (Ho), erbium (Er), and thulium (Tm), and one or more additives containing at least silver (Ag). In FIG. 1 it is shown that an RAg compound (R=Dy, Ho, Er, Tm, Pr, Nd, Ce), an $RAg_2$ compound, and combinations thereof exhibit a magnetic critical point (magnetic transformation point) in the range of about 10 to 30 K. Due to the existence of a peak of specific heat at about the magnetic critical point, the cold accumulating material according to the invention can improve the specific heat in the temperature range of about 10 to 30 K.

Figure 2:
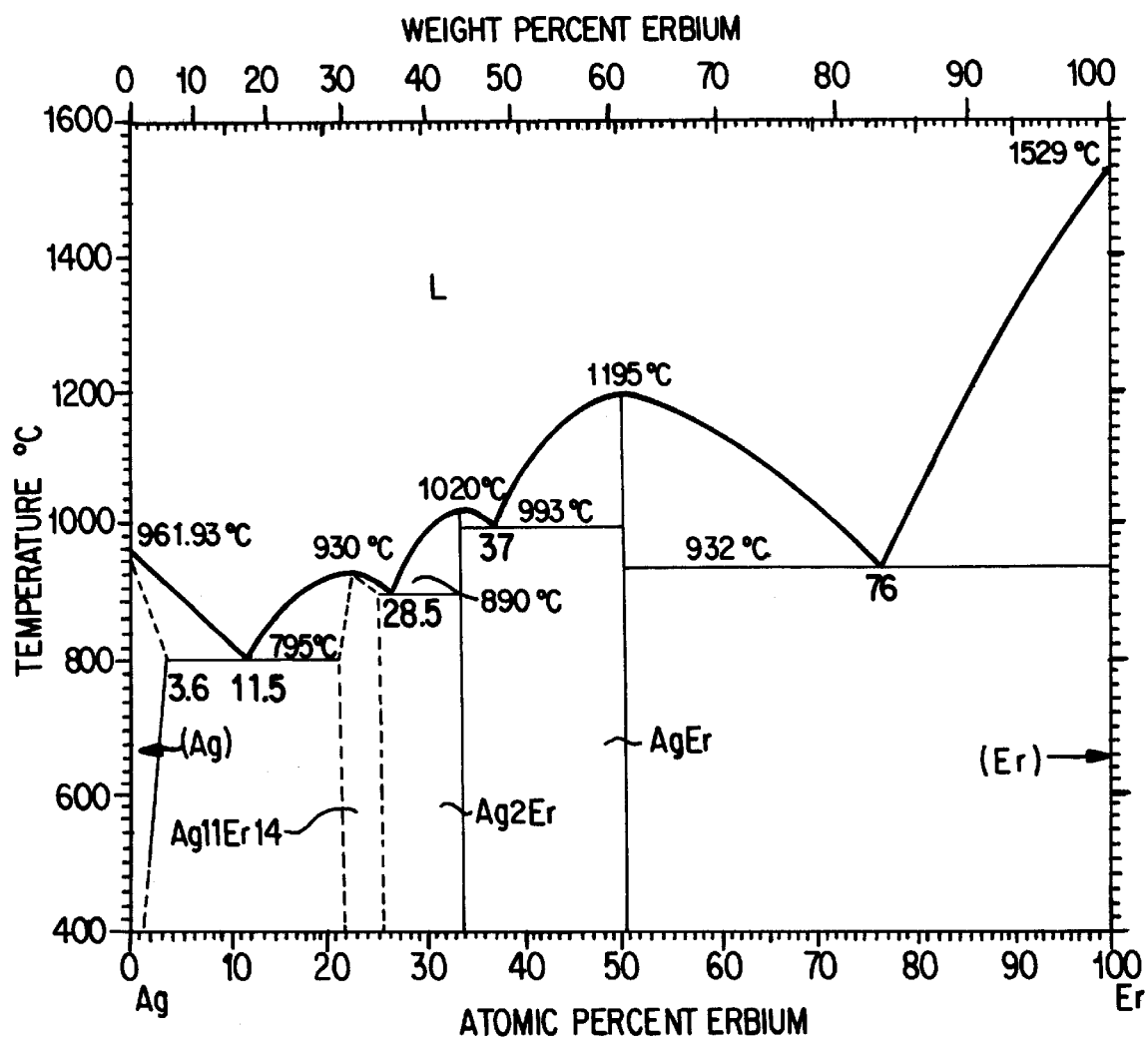
FIG. 2 is a phase diagram of Ag—Er.
Figure 3:
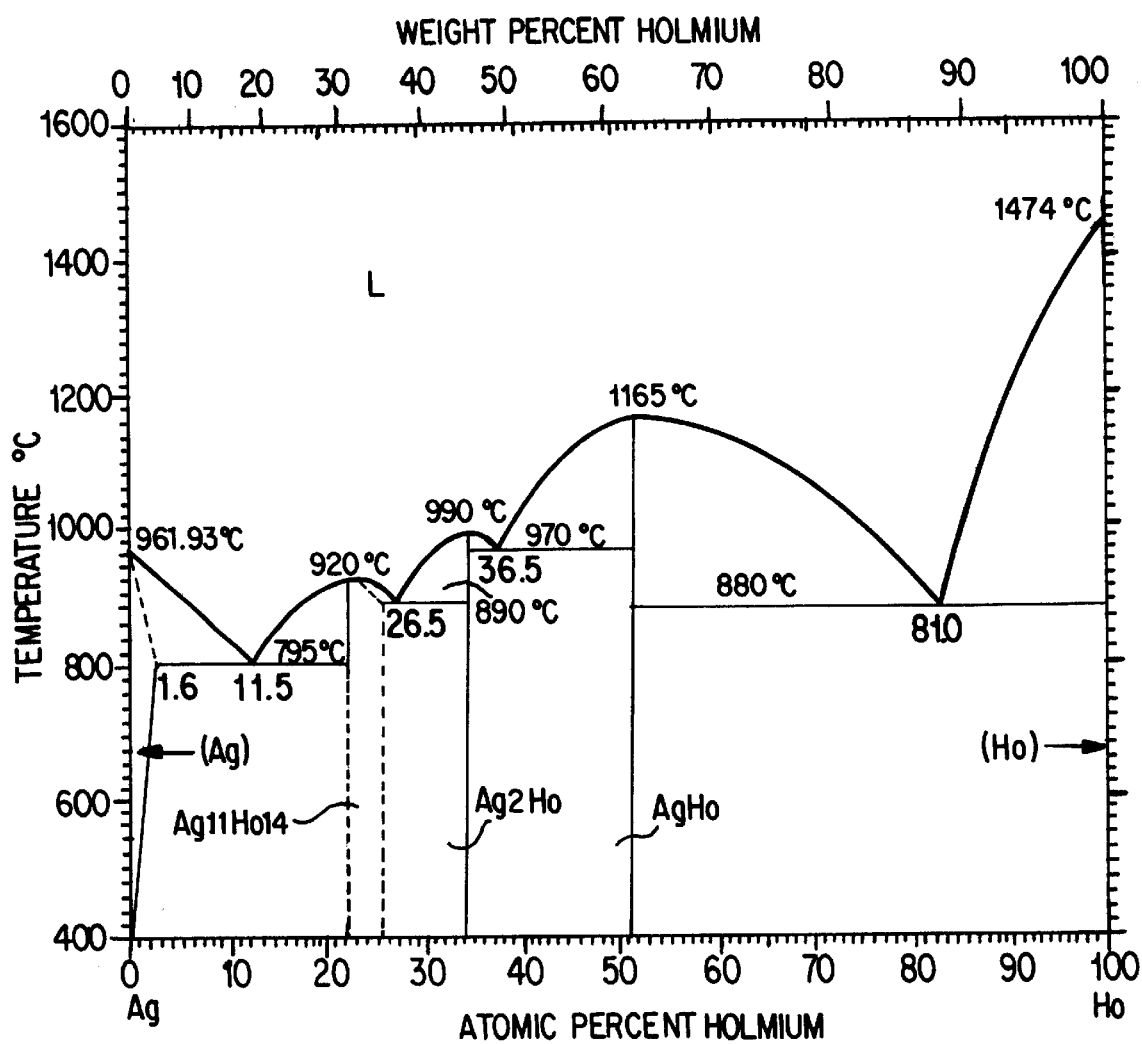
FIG. 3 is a phase diagram of Ag—Ho.

As shown in FIG. 2 of the Er—Ag phase diagram and in FIG. 3 of the Ho—Ag phase diagram, if the content of rare earth element R is not more than 20 at % (namely, the content of the additive element(s) is above 80 at %), the RAg compound, the $RAg_2$ compound, and the mixed RAg and $RAg_2$ compounds for which the magnetic critical point is about 10 to 30 K do not generate at all. Furthermore, the phase of Ag only generates specific heat due to spin vibration so that the specific heat in the 10 to 30 K range cannot increase. On the other hand, if the content of R is not less than 95 at % (namely, the content of the additive element(s) is not more than 5 at %), it is confirmed experimentally that the specific heat is decreased at around 10 K.

According to the invention it is possible to tailor the cold accumulating characteristics of the cold accumulating material as a function of the R content. For instance, if the content of rare earth element R is 20 to 50 at %, a mixture of the RAg and $RAg_2$ is generated. Therefore, as shown in FIG. 1, the peak of specific heat can be adjusted according to the ratio of the mixed compounds. On the other hand, if the content of rare earth element R is 50 to 95 at %, a mixture of the RAg compound and R is generated. As a result of this, the peak of specific heat can be adjusted according to the ratio of the mixed compounds. In addition, the heat transfer rate of Ag is greater than that of conventionally used Ni, so that Ag contributes significantly to the heat exchange ability of the material.

In order to increase the specific heat in the 5 to 10 K temperature range, it is preferable that the additive element (s) contain at least one element selected from the group consisting of boron (B), aluminum (Al), indium (In), silicon (Si), germanium (Ge), gallium (Ga), tin (Sn), gold (Au), magnesium (Mg), zinc (Zn), palladium (Pd), platinum (Pt), rhenium (Re), cesium (Cs), iridium (Ir), iron (Fe), manganese (Mn), chromium (Cr), cadmium (Cd), mercury (Hg), osmium (Os), phosphorus (P), lanthanum (La), yttrium (Y). The magnetic critical point of the compound containing such elements is under 30 K, so that the specific heat in the 5 to 10 K temperature range can increase.

In order to avoid decreasing the specific heat in the 10 to 30 K temperature range, it is preferable that the contents of the additive elements be maintained at 5 at % or less. If the contents are more than 5 at %, the specific heat in the 10 to 30 K temperature range decreases.

The present invention has the following effect. As described above, according to the present invention, that is, the cold accumulating material comprises 20 to 95 at % of at least one element (R) selected from the group consisting of cerium (Ce), neodymium (Nd), praseodymium (Pr), magnetic body dysprosium (Dy), holmium (Ho), erbium (Er), and thulium (Tm), and 5 to 80 at % of an additive containing at least silver (Ag), the Ag and R forming an RAg compound, $RAg_2$ compound, and/or mixture of RAg and $RAg_2$ compounds. The specific heat of the cold accumulating material according to the invention is increased compared to cold accumulating material containing conventional $Er_3Ni$ wherein the magnetic critical point is at 10 K or less (about 8 K). Furthermore, the inventive material includes Ag which has a higher heat transfer rate than that of Ni whereby the heat exchange ability of the inventive material is increased compared to the conventional $Er_3Ni$ material.

As described above, because the material according to the present invention can increase the efficiency of accumulating heat in the 10 to 30 K temperature range, the cold accumulator according to the present invention can be utilized in a refrigerator which generates refrigeration at low temperatures of 10 to 30 K.

The following nonlimitative examples illustrate features of the cold accumulating material according to the invention.

Example 1

An Er block 6.99 g (60 at %) and an Ag block 3.01 g (40 at %) are arranged in an arc melting furnace, and the inside of the arc melting furnace is evacuated, and subsequently filled with argon gas. After that, the cold accumulating material is produced by arc melting the blocks of Er and Ag, and after solidification of the melt thus produced a sample is cut having a sample size of 5×5×7 mm. The phase diagram of FIG. 2 shows that the composition of the cold accumulating material produced as above described provides a mixture of ErAg compound (the magnetic critical point is 21 K, and the peak of specific heat is 14 to 15 K) and Er (the magnetic critical point is 20 K, and the peak of specific heat is 19 K).

Figure 4:
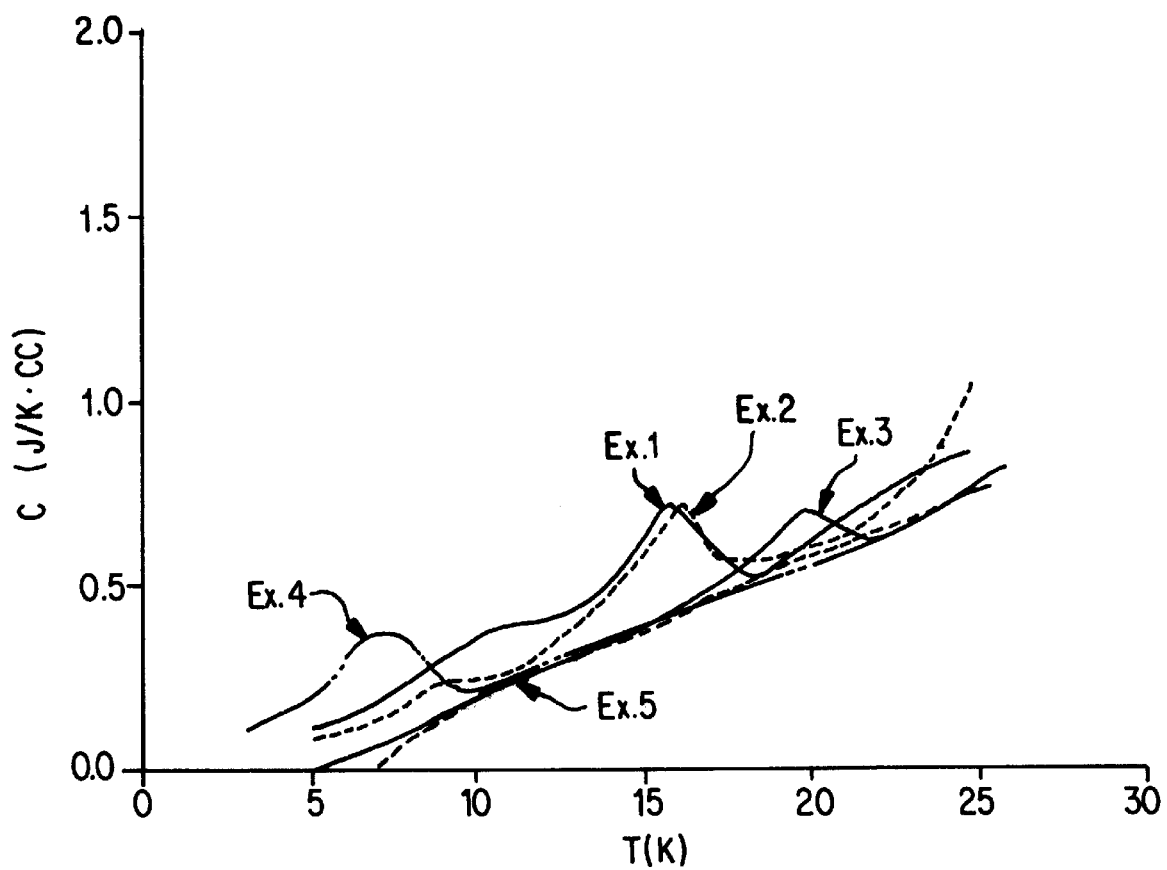
FIG. 4 is a graph of heat characteristics in a low temperature range of Examples 1 and 2 according to this invention and comparative Examples 3–5.

The specific heat of the cold accumulating material is measured over the temperature range of 3 to 25 K by an insulative method using a Ge thermometer. The insulative method is carried out by placing the sample under an insulative condition and adding Joule's heat $\Delta Q$ to the sample (ingot), measuring the temperature change $\Delta T$ of the sample, and calculating specific heat $\Delta C$ by dividing the Joule's heat $\Delta Q$ by the temperature change $\Delta T$ (namely $\Delta C = \Delta Q / \Delta T$). FIG. 4 shows the measured specific heat for Example 1.

As shown in FIG. 4, according to the cold accumulating material of Example 1, the specific heat in the temperature range of about 8.5 to 18 K is surprisingly and unexpectedly larger than that of conventional cold accumulating material containing $Er_3Ni$ (Example 4) or, conventional cold accumulating material containing Pb. The improvement in specific heat over the 8.5 to 18 K temperature range for the Example 1 material is believed to be due to the mixture of ErAg compound (magnetic critical point 18 K) and Er (magnetic critical point 20 K), the combination of which produces a peak of the specific heat at about 16 K under the influence of both magnetic critical points.

As shown in FIG. 4, the cold accumulating material of Example 1 has a specific heat at about 8.5 to 18 K which is larger than that of cold accumulating material containing only Er (Example 3). As the reason for this, it is believed that the peak of specific heat of the accumulating material of Example 1 exists at about 16 K.

Furthermore, according to the cold accumulating material of Example 1, the specific heat at about 21 to 25 K is larger than that of the cold accumulating material containing only Er (Example 3). As the reason for this, it is believed that the cold accumulating material in Example 1 has only the specific heat of the lattice vibration in comparison with Er (Example 3) having mainly the specific heat of spin vibration under the influence of the magnetic critical point. Further, the peak of the specific heat of cold accumulating material in Example 1 is relatively larger. As the reason for this, it is believed that the specific gravity of Ag and the specific heat of the lattice vibration is related.

Example 2

An Er block 7.84 g (70 at %) and an Ag block 2.16 g (30 at %) are arranged in an arc melting furnace and melted as in Example 1. The phase diagram of FIG. 2 shows that the cold accumulating material produced as above described has a mixture of ErAg compound (the magnetic critical point is 21 K, and the peak of specific heat is 14 to 15 K) and Er (the magnetic critical point is 20 K). Further, the Example 2 mixture has a smaller amount of ErAg compound compared to Example 1.

The specific heat of the cold accumulating material of Example 2 is measured as described in Example 1. The result is shown in FIG. 4.

As shown in FIG. 4, according to the cold accumulating material of Example 2, the specific heat at about 8.5 to 18 K is larger than that of the conventional cold accumulating material containing $Er_3Ni$ (Example 4) and the conventional cold accumulating material containing Pb (Example 5). As the reason for this, it is believed that the cold accumulating material of Example 2 is a mixture of ErAg compound (magnetic critical point 18 K), and Er (magnetic critical point 20 K), and the peak of the specific heat exists at about 10 to 20 K under the influence of both magnetic critical points.

According to the cold accumulating material of Example 2, the specific heat at about 8.5 to 18 K is larger than that of the cold accumulating material containing only Er (Example 3). As the reason for this, it is believed that the peak of the specific heat of the cold accumulating material of Example 2 exists at about 16 K.

Furthermore, according to the cold accumulating material of Example 2, the specific heat at about 21 to 25 K is larger than that of the cold accumulating material containing only Er (Example 3). As the reason for this, it is believed that the cold accumulating material in Example 2 has only the specific heat of the lattice vibration in comparison with Er (Example 3) having mainly the specific heat of spin vibration under the influence of the magnetic critical point.

Further, the peak of the specific heat of the cold accumulating material of Example 2 is larger relatively. As the reason for this, it is believed that the specific gravity of Ag and the specific heat of the lattice vibration is related.

According to the cold accumulator material in Example 2, the peak of specific heat is about 16.5 K, and shifts to the side of high temperature. As the reason for this, it is believed that the ratio of the AgEr compound is smaller in Example 2 compared with the cold accumulating material in Example 1.

Example 3

An Er block 10 g is melted, and then the cold accumulating material is produced. The specific heat of the cold accumulating material is measured as in Example 1, and the result is shown in FIG. 4.

As shown in FIG. 4, according to the cold accumulating material containing Er, though the specific heat thereof at 18 to 21 K is larger than that of Example 1 or Example 2, the specific heat thereof at 15 K is not only smaller than that of Example 1 or Example 2 but is also smaller than that of the conventional $Er_3Ni$ material of Example 4. As the reason for this, it is believed that the peak of the specific heat exists at about 20 K.

Example 4

An Er block 8.95 g (75 at %) and an Ni block 1.05 g (25 at %) are arranged in an arc melting furnace, and melted as in Example 1. The cold accumulating material thus produced corresponds to conventional $Er_3Ni$ (magnetic critical point is 8 K). The specific heat of the cold accumulating material of Example 4 is measured as in Example 1 and the result is shown in FIG. 4.

As shown in FIG. 4, according to the cold accumulating material in Example 4, the specific heat under 8 K is larger, but the specific heat above 8.5 K is smaller in comparison with Example 1 or Example 2. As the reason for this, it is believed that the magnetic critical point of $Er_3Ni$ exists at 8 K and the peak of the specific heat exists at about 7 K.

Example 5

A Pb block 10 g is melted, and then the cold accumulating material is produced. The specific heat of the cold accumulating material is measured as in Example 1, and the result is shown in FIG. 4.

As shown in FIG. 4, according to the cold accumulating material in Example 5, the specific heat under 25 K is smaller in comparison with Example 1 or Example 2. As the reason for this, it is believed that the specific heat of the lattice vibration based in the lattice vibration is decreased remarkably with decreasing of temperature, and the cold accumulating material does not have the specific heat of the spin vibration.

According to the invention, a refrigerator packed with cold accumulating material such as in Example 1 or Example 2 can be used for various types of refrigeration equipment such as the Stirling type, GM type, Pulse tube type, Solvay type, the resonance type, etc., which generate refrigeration at temperatures under 30 K, particularly at 8.5 to 30 K. Further, the composition of the inventive cold accumulating material can be adjusted for use in different cold accumulating sections of a multiple refrigerator, i.e., in a refrigerator having successive cold accumulating sections, the composition of cold accumulating material of the invention can be tailored to meet the specific temperature requirements of each of the cold accumulating sections.

The invention also provides a cold accumulator filled with a cold accumulating material, the material comprising 20 to 95 at % of at least one element selected from the group consisting of cerium (Ce), neodymium (Nd), praseodymium (Pr), magnetic body dysprosium (Dy), holmium (Ho), erbium (Er), and thulium (Tm), and 5 to 80 at % of an additive containing at least silver (Ag), thereby improving the specific heat at 10 to 30 K. Accordingly, the invention can increase the efficiency of heat accumulating at 10 to 30 K, and the cold accumulator according to the present invention can be applied to a refrigerator which generates refrigeration at temperatures of 10 to 30 K.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A cold accumulator which generates refrigeration at temperatures of 10 to 30 K and is filled with a cold accumulating material, the cold accumulating material having a magnetic critical point at a temperature of 10 to 30 K and consisting of:

compounds of formula $R_xAg_{100-x}$ wherein R is at least one rare earth element selected from the group consisting of cerium (Ce), neodymium (Nd), praseodymium (Pr), magnetic body dysprosium (Dy), holmium (Ho), erbium (Er) and thulium (Tm) and wherein $20 \leq x \leq 95$ at %.

2. A cold accumulator according to claim 1, wherein the cold accumulating material includes 20 to 95 at % Er.

3. A cold accumulator according to claim 1, wherein the cold accumulating material includes 20 to 95 at % Ho.

4. A cold accumulator according to claim 1, wherein the additive includes 5 to 80 at % Ag.

5. A cold accumulator according to claim 1, wherein the cold accumulating material exhibits a magnetic critical point between 10 and 30 K.

6. A cold accumulator according to claim 1, wherein the cold accumulating material includes a compound of RAg or $RAg_2$ or mixture of RAg and $RAg_2$ compounds.

7. A refrigerator which generates refrigeration at temperatures of 10 to 30 K, the refrigerator comprising:

a refrigerant gas; and a cold accumulator filled up with cold accumulating material, the cold accumulating material having a magnetic critical point at a temperature of 10 to 30 K and consisting of compounds of formula $R_xAg_{100-x}$ wherein R is at least one rare earth element selected from the group consisting of cerium (Ce), neodymium (Nd), praseodymium (Pr), magnetic body dysprosium (Dy), holmium (Ho), erbium (Er) and thulium (Tm) and wherein $20 \leq x \leq 95$ at %, the refrigerant gas passing through the cold accumulating material and cooling the cold accumulating material to a temperature of 10 to 30 K.

8. A refrigerator according to claim 7, wherein the cold accumulating material includes 20 to 95 at % Er.

9. A refrigerator according to claim 7, wherein the cold accumulating material includes 20 to 95 at % Ho.

10. A refrigerator according to claim 7, wherein the additive includes 5 to 80 at % Ag.

11. A refrigerator according to claim 7, wherein the cold accumulating material exhibits a magnetic critical point between 10 and 30 K.

12. A refrigerator according to claim 7, wherein the cold accumulating material includes a compound of RAg or $RAg_2$ or mixture of RAg and $RAg_2$ compounds.

13. The refrigerator of claim 7, wherein the refrigerant gas is compressed and passed in one direction through the cold accumulating material, the refrigerant gas is then expanded and passed in an opposite direction back through the cold accumulating material.

* * * * *